April 9, 1957     S. GABRIELSON     2,787,908
INSTRUMENT CAGING ARRANGEMENTS
Filed Oct. 28, 1955     2 Sheets-Sheet 1

Inventor:
Samuel Gabrielson
by, Richard E. Hosley
His Attorney

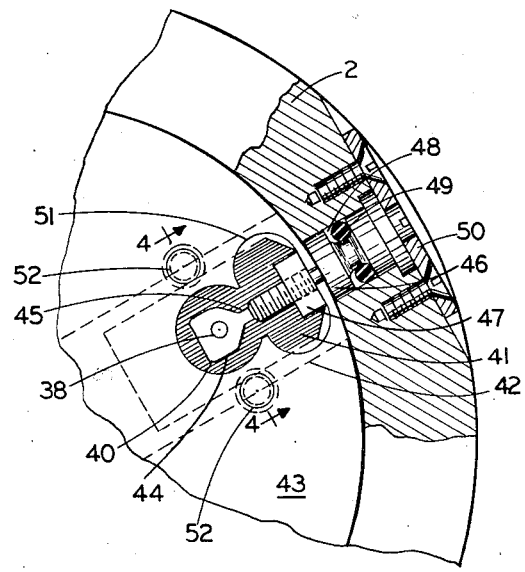
Fig. 2
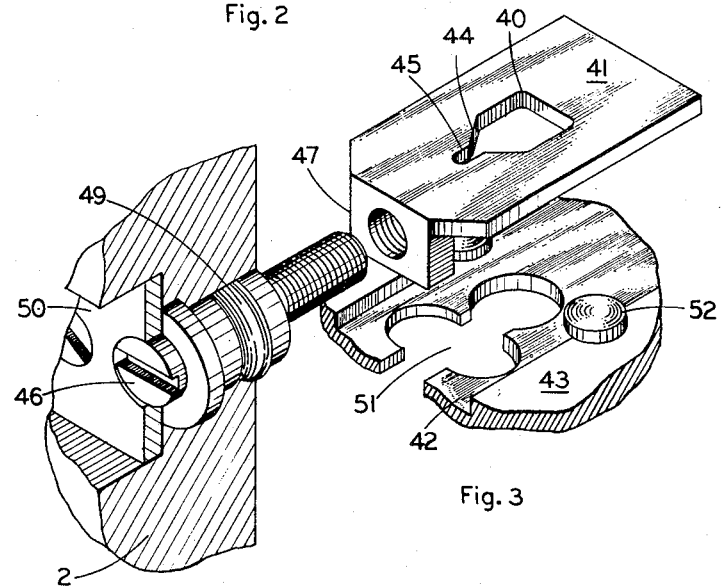
Fig. 3
Fig. 4
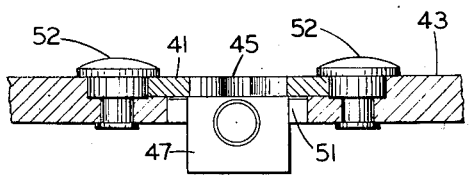

United States Patent Office 2,787,908
Patented Apr. 9, 1957

2,787,908

INSTRUMENT CAGING ARRANGEMENTS

Samuel Gabrielson, Lynnfield, Mass., assignor to General Electric Company, a corporation of New York Application October 28, 1955, Serial No. 543,547

6 Claims. (Cl. 74—5.1)

This invention relates to instrument caging arrangements and, more particularly, to improvements in caged gyroscopic apparatus.

Caging devices are commonly employed in the gyroscope art to orient gyro rotor structures in predetermined and invariable attitudes in relation to other parts of gyroscopic instruments. Such devices may aid in establishing proper relationships of gyroparts before an instrument is relied upon, and may also be used to lock delicate elements rigidly in position so that susceptibility to damage is minimized. It is essential that caging devices be precise in their operation, since the accuracy of gyroscopic instruments is frequently dependent upon the precision with which they are caged and that they also be rugged in their design, such that they will withstand the large gyroscopic forces imposed upon them. In addition, the caging apparatus should be simple to operate without disturbing the assembled structure. However, in the past, requirements of great precision and strength have been largely satisfied only at the expense of using very accurately machined components of substantial size, complexity and weight. In many equipments wherein hermetic sealing has been necessary, the actuating mechanisms for such caging devices have been intricate and costly.

Accordingly, it is an object of this invention to provide a novel and improved gyro caging device which serves not only to lock a gyro rotor structure in a predetermined position for operational purposes and for shipment, but also to limit the allowable rotational movement of the rotor structure to a given range.

Another object is to provide an improved caging device of the character described which may be operated from the outside of a sealed gyro unit without breaking the seals.

Still another object is to provide an instrument caging mechanism which utilizes a minimum of precision-made components but which provides highly precise operational characteristics.

By way of a summary account of a specific aspect of this invention, I provide a hermetically sealed single-axis gyroscope with caging means having a simple screw-threaded element extending into the sealed enclosure. This element may consist of a flanged screw rotatable but axially fixed in relation to the enclosure casing; packing or gasket material may be provided about the element to maintain the enclosure in a sealed condition. Inside the casing an internally threaded stop plate provided with a slot of varying width is moved in a given path by rotation of the threaded element. A pin or other projection fixed to the rotor bearing structure extends into the slot, and by reason of the varying width of the slot, movement of the stop plate will confine the pin within the slot to various extents depending upon the position of the stop plate at any given time. Cammed surfaces are provided between areas of greater and lesser width in the stop plate slot to force the pin into the narrower portions of the slot. In the caged position of the stop plate, the slot is narrow enough to contain the pin without permitting it movement, while in another position the pin is permitted a limited amount of angular movement between the limits of the slot for ease of assembly and for defining the useful limits of precession.

The stop plate itself is positioned between two rivets or posts instead of in an accurately machined groove. This structure permits the plate a slight amount of rotational movement about a point midway between the posts, but since the caged position of the pin is located at the midway point, this looseness does not affect the accuracy of caging. Not only does such a mounting eliminate a precise machining operation, replacing it by the simple positioning of two members, but the looseness of mounting has the further advantage that the actuating screw element itself need not be accurately aligned with the caged position, since slight deviations of the screw element from accurate alignment do not affect either the ease of assembly or the accuracy of the caged position.

Although the instant invention is not to be limited, except by the scope of the appended claims, the details of the invention itself, as well as additional objects and advantages, may best be understood in connection with the following description together with accompanying drawings, wherein:

Figure 2 is an enlarged partially sectionalized view taken on line 2—2 of Figure 1 of a caged gyroscopic instrument constructed in accordance with my invention.

Figure 3 is an exploded, perspective view of the elements illustrated in Figure 2.

Figure 4 is an enlarged cross-section view taken on line 4—4 of Figure 2.

Figure 1:
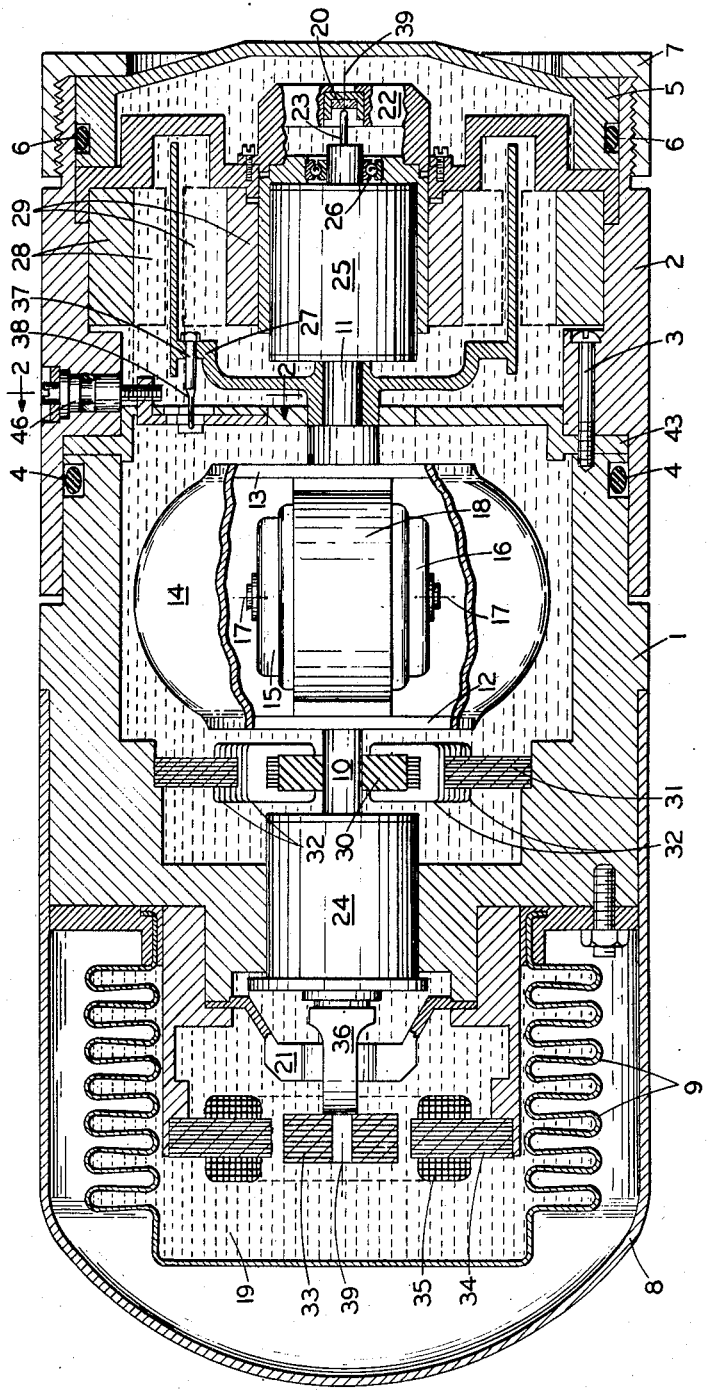
Figure 1 is a view, partly in cross-section and partly in perspective of a single-axis gyro embodying one form of a caging device in accordance with the present teachings.

Details of a single-axis gyro unit assembly in which my invention is particularly useful appear in Figure 1, wherein the generally cylindrical outer casing includes subassemblies 1 and 2 rigidly connected by bolts such as 3 and sealed in a fluid-tight relationship by a gasket 4. One end is closed by a cap 5 which is sealed to subassembly 2 by a gasket 6 and is fixed in position by an annular clamping member 7 threaded onto subassembly 2. The opposite end is capped externally by a cylindrical closed end cover 8 which is fitted upon subassembly 1. Within and protected by cover 8 is a metal expansion bellows 9 which is affixed to subassembly 1 by bolts and sealed in fluid-tight relationship with it to form a totally sealed chamber. Shafts 10 and 11 within this chamber are attached to end plates 12 and 13 respectively, of a liquid-tight gyro container which these plates form in conjunction with the shell 14, the two shafts being co-linear along an axis which is the single pivotal support axis for the gyroscope. The gyro rotor halves 15 and 16 are rotated at high speed about spin axis 17—17 inside this container, the support for the rotor halves and electrical rotor motor being provided by a frame 18 extending between container end plates 12 and 13. Gyro rotor structures of this type are disclosed in the copending application of Harry C. Wendt, Serial No. 325,577 filed December 12, 1952, for "Symmetrical Gyroscope," now Patent No. 2,731,836, the assignee being the same as that of the present application. The sealed container for the gyro rotor halves 15 and 16 is so dimensioned that it neutrally buoys all the weight supported by it when wholly immersed in the non-viscous liquid 19 which fills the sealed chamber defined by bellows 9, subassemblies 1 and 2, and end cap 5. Lateral movements of the shafts 10 and 11 are limited by surfaces of bearing members, such as 20 which are set in end brackets 21 and 22 affixed to subassemblies 1 and 2, respectively. Preferably, shafts 10 and 11 are provided with slender projections, such as 23, which may abut members such as 20 without introducing significant frictions about the axis of these shafts. Magnetic suspension units 24 and 25 of a known type are also affixed to subassemblies 1 and 2, respectively, to afford frictionless support of shafts 10 and 11, while load bearings of conventional design, such as bearing unit 26, are positioned to engage and further support the shafts only if extreme shock forces or serious injuries prevent the magnetic suspension units from accomplishing the full support needed to protect against damage.

A lightweight conductive cylindrical restraining member 27 is attached to shaft 11 and extends through the annular gap which appears between the concentric permanent magnet members 28 and 29 supported with subassembly 2. As they appear in Figure 1, magnets 28 and 29 are not fully cross-hatched between their innermost and outermost dimensions, inasmuch as the cross-section is taken along a plane passing intermediate radially extending pole pieces of these magnets. A pickoff is illustrated as comprising a magnetic material rotor 30 attached to shaft 10, and a stator core 31 and excitation and output windings 32 affixed to subassembly 1. Such variable impedance pickoffs with unwound rotors are well known to those skilled in the art. A torque motor for exerting torques about the support axis may also be of a known type having an unwound rotor 33 and a stator core 34 and winding 35 fixed with subassembly 1. In the arrangement shown, the rotor 33 is positioned out beyond the end bracket 21, this assembly being permitted by a ring-shaped coupling member 36 which encircles the hub of bracket 21.

One arrangement for practicing this invention is shown as comprising a pilot screw 37 threadably positioned on restraining member 27. The end of pilot screw 37 forms a pin 38, which in cooperation with other elements hereinafter described serves to limit the rotation of the gyro rotor structure about axis 39—39 to a predetermined angle on both sides of a center position. Upon suitable adjustment of the cooperative elements to be described, pin 38 also serves as a locating device to cage the gyro rotor structure in a predetermined position relative to the instrument frame prior to its operation and to lock the gyro in this position for the purpose of preventing injury to delicate components.

As more clearly viewed in Figure 2, pin 38 projects into cutout section 40 of stop plate 41, which is slidable in slot 42 of bearing plate 43. It can readily be seen that when pin 38 occupies the widened portion of cutout section 40, the side walls thereof limit the angular displacement of the pin, and hence, the rotation of the gyro rotor structure to a predetermined extent. Obviously, the extent of rotation may be varied by changing the width of opening 40. As stop plate 41 is moved in its slot toward the center of the gyro structure, cam surfaces 44 will force pin 38 toward a central position until the pin is confined within the narrow neck 45 of the cutout section. While I have shown a preferred shape of pin 38 and opening 40, it is obvious that other shapes are permissible to accomplish the same or similar results and that the positions of the pin and opening may be reversed or otherwise varied without departing from the invention.

In order to accomplish radial movement of stop plate 41, in a preferred form of my invention I provide a screw 46 cooperating with an internally threaded hole in dependent lug 47 of the stop plate. Screw 46 is a special flanged screw grooved at 48 for a sealing ring 49, and held in place by a flat plate 50 secured to outer casing 2 by any suitable means. This construction permits rotation of screw 46 about its axis while preventing axial movement of the screw and maintaining the seal on the fluid chamber. It can thus be seen that rotation of the screw in one direction will draw stop plate 41 toward the outside of the gyro casing, placing the pin 38 in the widened portion of cutout section 40; rotation of the screw in the opposite direction will force the pin into the neck 45 of the cutout section, thereby effectively locking the gyro assembly against movement relative to the casing. In order that the stop plate 41 may not be forced in either direction to such an extent that the ends of opening 40 might be forced against pin 38, damaging it, the position of the stop plate is restricted between limits fixed by the movement of lug 47 within keyhole opening 51 in bearing plate 43.

The positioning of the stop plate is governed not by the slot 42 within which it moves, but, in one aspect, by two shouldered rivets 52. It is thus seen that the stop plate is permitted a slight amount of rotational "looseness" about a point midway between the two rivets. In its locked or fully caged position, the pin is disposed at this central point. Therefore, each time stop plate 41 is moved inward, the pin 38 will arrive at the same position, regardless of the stop plate's angular disposition. Not only have I eliminated the disadvantages attendant upon machining an accurate groove for the stop plate to slide in, while retaining accuracy of the caging operation, but another important advantage has accrued, for the opening in casing 2 through which screw 37 extends need not be fixed with a high degree of precision with respect to the internal caging apparatus. It can be seen that the small amount of looseness of the stop plate will permit the stop plate to adjust itself to minor variations in the location of the screw. While I have shown two flanged rivets as the mounting elements for the stop plate, it is evident that other substantially point-contact elements such as posts, or balls could be employed, the only important requirement being that the mounting elements contact the sides of the stop plate at substantially single positions on a line perpendicular to the parallel edges of the plate.

Although particular embodiments of this invention have been shown and described herein, it will occur to those skilled in the art that various other modifications, substitutions, and rearrangements can be effected without departing either in spirit or in scope from the invention set forth in the appended claims.

What I claim as new and desire to secure by Letters Patent of the United States is:

1. An apparatus for varying the extent of rotational freedom between two relatively rotatable members comprising a stop element having two parallel edges; means mounting said stop element on one of said members for movement in a path parallel to said edges; said mounting means comprising two substantially point-contact elements contacting said edges at points on a single line perpendicular to both edges and restraining said stop element against lateral movement; an aperture of non-uniform width intermediate said edges, the width of said aperture varying along the path of movement of said stop element; a projection on the other of said members extending into said aperture; the dimensions of said projection and aperture being such that in at least one position in the path of movement of said stop element, said projection is permitted a limited, predetermined amount of angular freedom, and in at least one other position in the path of movement of said stop element said projection is rigidly constrained against angular motion; the position of said projection when rigidly constrained being on the line joining the aforesaid points of contact.

2. An apparatus for varying the extent of rotational freedom between an element and a relatively rotatable member comprising a movable stop member having two parallel edges; means mounting said stop member on said element for movement in a path parallel to said edges; said mounting means comprising two substantially point-contact devices contacting said edges at points on a single line perpendicular to both edges and restraining said stop member against lateral movement; an aperture of non-uniform width in one of said members; a projection on the other of said members extending into said aperture; the dimensions of said projection and aperture being such that in at least one position in the path of movement of said stop member a limited, predetermined amount of relative angular movement is permitted between said projection and aperture, and in at least one other position in the path of movement of said stop member no relative movement is permitted between said projection and said aperture; the position of said projection when no relative movement is permitted being on the line joining the aforesaid points of contact.

3. An apparatus for varying the extent of rotational freedom between a stationary gyroscope member and a relatively rotatable element comprising a stop element having two parallel guide edges; means mounting said stop element on said member for movement in a path parallel to said edges; said mounting means comprising two stationary contact devices contacting said edges at positions on substantially a single line perpendicular to both edges and restraining said stop element against lateral movement; an aperture of non-uniform width in one of the aforesaid elements; a projection on the other of said elements extending into said aperture; the dimensions of said projection and aperture being such that in at least one position in the path of movement of said stop element a limited, predetermined amount of relative angular movement is permitted between said projection and aperture, and in at least one other position of said stop element no relative movement is permitted between said projection and aperture; the position of said projection when no relative movement is permitted being on a line joining the aforesaid positions of contact.

4. In combination with a gyroscopic apparatus having a hermetically sealed enclosure, a rotor bearing structure mounted within said enclosure, and means supporting said rotor bearing structure for angular movement about a support axis normal to the spin axis of said rotor structure, caging and motion limiting means for said rotor bearing structure comprising threaded screw means extending into said hermetically sealed enclosure from the outside; means mounting said screw means for rotational motion and constraining said screw means against axial motion; means maintaining hermetic sealing about said screw means; a stop plate threadably engaging said screw means; means limiting motion of said stop plate to movement parallel to the axis of said screw means; an aperture in said stop plate, the width of said aperture varying transversely to the path of said stop plate; a projection attached to said rotor bearing structure and extending into said aperture; the dimensions of said aperture and projection being such that in at least one position of said stop plate a limited, predetermined amount of angular freedom is permitted said projection between the limits of said aperture, and in at least one other position of said stop plate the projection is rigidly constrained against angular movement by the limits of said aperture.

5. In combination with a single-axis gyroscopic device having a hermetically sealed enclosure, a rotor bearing member, and means supporting said rotor bearing member within said enclosure for angular movement about a single axis, caging and motion limiting means for said rotor bearing member comprising an actuating element extending into said enclosure from the outside thereof; means maintaining hermetic sealing between the enclosure and actuating element; a stop member within said enclosure having two parallel edges and movable by said actuating element; means defining the path of movement of said stop member comprising a pair of substantially point contact devices contacting said parallel edges at points on substantially a single line perpendicular to both edges and restraining said member against lateral movement; an aperture of non-uniform width in one of the aforesaid members; a projection on the other of said members extending into said aperture; the dimensions of said projection and aperture being such that in at least one position of said stop member a limited, predetermined amount of relative angular movement about said axis is permitted between said projection and aperture, and in at least one other position of said stop member said projection is confined to a position substantially perpendicular to the mid-point of a line joining the aforesaid point contact devices.

6. In combination with a gyroscopic apparatus having a hermetically sealed enclosure, a rotor bearing structure mounted within said enclosure, and means supporting said rotor bearing structure for angular movement about a support axis, caging and motion limiting means for said rotor bearing structure comprising a rotatable setting member extending into said enclosure from the outside thereof; means mounting said setting member for rotational movement and constraining said setting member against axial movement; means maintaining hermetic sealing about said member; a stop member having two parallel edges; means mounting said stop member within said enclosure for movement by said setting member in a path parallel to said edges; said mounting means comprising two substantially point-contact elements contacting said edges at points on a single line perpendicular to both edges and restraining said stop member against lateral movement; an aperture of non-uniform width intermediate said edges, the width of said aperture varying transversely to the path of movement of said stop member; a projection on said rotor bearing structure extending into said aperture; said aperture in at least one position of the stop member permitting a limited, predetermined amount of angular motion by said projection and in at least one other position of said stop member rigidly constraining said projection against angular motion, the position of said projection when rigidly constrained being on the line joining the aforesaid points of contact.

References Cited in the file of this patent

UNITED STATES PATENTS

| | | |
|---|---|---|
| 1,851,536 | Bates | Mar. 29, 1932 |
| 2,641,133 | Barkalow et al. | June 9, 1953 |